United States Patent [19]

Fell

[11] Patent Number: 5,316,604
[45] Date of Patent: May 31, 1994

[54] PROCESS FOR THE PREPARATION OF THERMOPLASTIC SANDWICH STRUCTURES

[75] Inventor: Barry M. Fell, Hummelstown, Pa.

[73] Assignee: Hexcel Corporation, Pleasanton, Calif.

[21] Appl. No.: 120,028

[22] Filed: Sep. 13, 1993

Related U.S. Application Data

[63] Continuation of Ser. No. 844,547, Mar. 2, 1992, abandoned, which is a continuation-in-part of Ser. No. 622,253, Dec. 4, 1990, abandoned.

[51] Int. Cl.⁵ .............................................. B32B 31/26
[52] U.S. Cl. .................................... 156/82; 156/197; 156/244.11; 156/244.22; 156/244.23; 156/320; 156/322; 156/324
[58] Field of Search ............ 156/82, 197, 243, 244.22, 156/244.23, 320, 322, 324, 497, 499; 428/72, 73, 116, 117, 118, 119

[56] References Cited

U.S. PATENT DOCUMENTS

| | | |
|---|---|---|
| 2,821,616 | 1/1958 | Spott . |
| 2,919,472 | 1/1960 | Steele . |
| 3,062,698 | 11/1962 | Aykanian ............................ 156/322 |
| 3,247,039 | 4/1966 | Schultheiss ......................... 156/243 |
| 3,356,555 | 12/1967 | Jackson . |
| 3,644,159 | 2/1972 | Edkuist .................................. 156/82 |
| 3,769,129 | 10/1973 | Williams . |
| 3,769,131 | 10/1973 | Genson . |
| 3,817,808 | 6/1974 | Ronan et al. ........................ 156/320 |
| 3,994,769 | 11/1976 | Gersbeck ............................. 156/499 |
| 4,249,976 | 2/1981 | Hudson . |
| 4,496,024 | 1/1985 | Wolf et al. . |
| 4,872,930 | 10/1989 | Kajikawa et al. . |
| 4,902,365 | 2/1990 | Westlake, Sr. . |
| 4,957,577 | 9/1990 | Huebner . |
| 5,022,943 | 6/1991 | Zaima . |
| 5,037,498 | 8/1991 | Umeda . |
| 5,039,567 | 8/1991 | Landi et al. . |
| 5,071,504 | 12/1991 | Singer ................................ 156/320 |
| 5,139,596 | 8/1992 | Fell .................................... 156/322 |

FOREIGN PATENT DOCUMENTS

| | | |
|---|---|---|
| 1130998 | 6/1962 | Fed. Rep. of Germany ...... 156/497 |
| WO8706186 | 10/1987 | PCT Int'l Appl. . |
| 666090 | 6/1979 | U.S.S.R. ............................. 156/499 |
| 1497033 | 7/1989 | U.S.S.R. ............................. 156/499 |
| 312801 | 6/1929 | United Kingdom . |
| 805976 | 12/1958 | United Kingdom ................ 156/497 |

*Primary Examiner*—Caleb Weston

[57] ABSTRACT

Rapid production of thermoplastic sandwich structures containing fiber-reinforced or non-reinforced thermoplastic core, such as honeycomb, materials adhered to skins or facing sheets is accomplished by fusion bonding the skins or facing sheets to the core by means of thermoplastic film(s) heated to the melt temperature and applying sufficient pressure to fusion bond the skins or facing sheets to the core, followed, when necessary, by cooling the assembly to prevent overheating of the core and/or skins or facing sheets.

11 Claims, 3 Drawing Sheets

PROCESS FOR THE PREPARATION OF THERMOPLASTIC SANDWICH STRUCTURES

This application is a continuation of application Ser. No. 07/844,547, filed Mar. 2, 1992, which in turn is a continuation-in-part of application Ser. No. 07/662,253, filed Dec. 4, 1990, now abandoned.

BACKGROUND OF THE INVENTION

1. Field of the Invention

The subject invention pertains to the preparation of thermoplastic sandwich structures wherein facing sheets or skins are applied to a fiber-reinforced or non-reinforced thermoplastic core in a rapid and cost-effective manner. More particularly, the invention relates to the fabrication of thermoplastic honeycomb sandwich structures wherein facing sheets or skins having a layer of thermoplastic film are applied to thermoplastic honeycomb core substantially simultaneously with application of the pressure bonding.

2. Description of the Related Art

Honeycomb sandwich panels and foam core sandwich panels are used in the transportation, aerospace and recreation industries where a planar or modestly curvilinear structure which is also exceptionally light is needed. In copending application Ser. No. 07/531,184 now U.S. Pat. No. 5,139,596, the entire disclosure of which is incorporated herein, by reference thereto, a continuous method for the production of thermoplastic honeycomb is disclosed which should enable increased utilization of these structural components.

Following production of honeycomb or foam core by whatever method, the finished core is sawn or slit into planar segments of the required thickness and typically, a heat-curable thermosetting film adhesive, for example an epoxy resin is used to bond the skin, which is generally a film, or a fiber reinforced prepreg or laminate, to the core. The core assembly, with facing sheets and film adhesives, is heated while pressure is applied to the assembly. Following a curing time which is generally several hours long, the assembled sandwich panel may be cut into appropriate size for its intended application.

The typical processes of bonding the honeycomb or foam core to the facing sheets as practiced by prior art processes are time consuming and often utilize relatively expensive film adhesives whose adhesion, viscosity, and cure cycles must often be tailored for each specific application. Typically, if either a thermoplastic, thermoset or other type of facing is desired, then a heated platen press is used with press stops. The heat for fusion or for advancing the thermoset adhesive is transferred from the platen through the skin material (thereby, sometimes limiting the thickness of the skin material) to the underlying core material, the adhesive fused or cured, whereupon the sandwich structure is then cooled under pressure before removing the assembled and bonded sandwich structure. When bonding facing materials with this aforementioned method to a thermoplastic core material such as a thermoplatic honeycomb or thermoplastic foam core, the thermoplastic core material has a tendency to collapse while the skin is bonded to the surface. This is due to excessive heat transfer through the skin to the core, thus raising the temperature of certain portions of the core beyond the $T_g$ (or softening point) of the thermoplastic core material with a resulting distortion or collapsing of the thermoplastic core during the skin bonding process. This is particularly a problem when one tries to bond a skin material with a $T_g$ nearly the same as or higher than that of the core material itself. The method taught by Hudson (U.S. Pat. No. 4,249,976) is typical of the art practiced today in sandwich panel construction wherein a skin material is adhesively bonded to the core wherein the adhesive layer is a thermoplastic adhesive (see column 3, lines 23–30) or for that matter, more typically, an epoxy thermoset film adhesive, a method which has been in use for decades. The Hudson method comprises; a) layering a sheet of thermoplastic (or thermoset for that matter) onto the core; b) laying a skin thereon; c) heating the assembly to soften (or cure) and bond the skin to the core; and d) cooling the assembly (see column 4, lines 27–29 and column 4, lines 64-column 5 line 2). Westlake (U.S. Pat. No. 4,902,365), Zaima (U.S. Pat. No. 5,022,943) and Wolf (U.S. Pat. No. 4,496,024) all teach methods of fabrication which are similar to that of Hudson's. The common factor to all of the aforementioned patents is that essentially the entire sandwich panel assembly is heated to the bonding temperature while under pressure. If a thermoplastic core were used in any of the aforementioned methods, the collapse or distortion of the core would occur if the temperature required for bonding exceeds the $T_g$ of the honeycomb material.

Umeda (U.S. Pat. No. 5,037,498) and Landi (U.S. Pat. No. 5,039,567) describe alternative methods for heating the entire honeycomb structure. Both, however, describe a multiple step method which requires that the heat required for bonding be applied down through the facing material while simultaneously applying pressure through the heat transfer device, typically a platen. This pressure is maintained until adequate heat has been transferred to the underlying honeycomb material through the skin material and is sufficient to cause either (in the case of Landi), the melting of the cell edges of the honeycomb material, whereupon, the pressure device is then rapidly cooled before removal of the pressure, or (in the case of Umeda), curing of a thermoset adhesive attached to the honeycomb cell edge.

In the case of Landi, the core cell edges are first deformed prior to bonding a skin in place (column 5, lines 39–47), thus, most likely, increasing the thermal mass of the cell edges relative to the thermal mass of the facing material and thereby, possibly reducing the probability of honeycomb collapse. Umeda is, essentially, just a continuous, stepwise progression of any of the methods described above (column 3, line 63 to column 4, line 47).

Additionally, all of the aforementioned methods, using a thermoplastic or thermoset facing material, require the use of a release substrate between the heating/pressure device and the facing material during the bonding cycle.

Additional prior art of note concerns the continuous lamination of plastic materials. Kajikawa (U.S. Pat. No. 4,872,930) (column 4, lines 20-37) and Williams (U.S. Pat. No. 3,769,129) (column 2 lines 9-14) describe the continuous application of thermoplastic materials in layer form upon some other entity. They are typical in that they describe the heating of the thermoplastic material in its entirety, usually from the outside surface to the inner surface, prior to the consolidation and cooling steps.

Finally, the known art of bonding facing materials to honeycomb for structural panels has generally been limited to either all thermoset materials, combinations of metal facings and thermoset cores, thermoplastic facings glued with thermoset adhesives or lower melting thermoplastic adhesives to thermoset and more recently, thermoplastic honeycombs or multiple step processing of similar thermoplastic materials. The use of facings made of material the same or higher $T_g$ as the honeycomb core or foam core materials themselves, or film layers of the same or higher $T_g$ than the facings and/or core materials has not been done before on a continuous basis nor has it been taught elsewhere how one would overcome the problems of core collapse that the use of these same materials would cause.

OBJECTS OF THE INVENTION

It has now been discovered that a thermoplastic honeycomb core or other thermoplastic core material may be bonded to facing sheets by the use of a thermoplastic material, or a thermoset material with a phase in which thermoplastic behavior is present, in the form of a film which is previously adhered to the facing sheets or is supplied as a separate element or is preferably an integral part of the facing sheet, without the need for release agents, in a continuous and novel fashion. By this process, relatively inexpensive and readily available thermoplastic films may be used and the cycle time for bonding of the face sheets reduced from several hours to only seconds.

DESCRIPTION OF THE PREFERRED EMBODIMENTS

Figure 1:
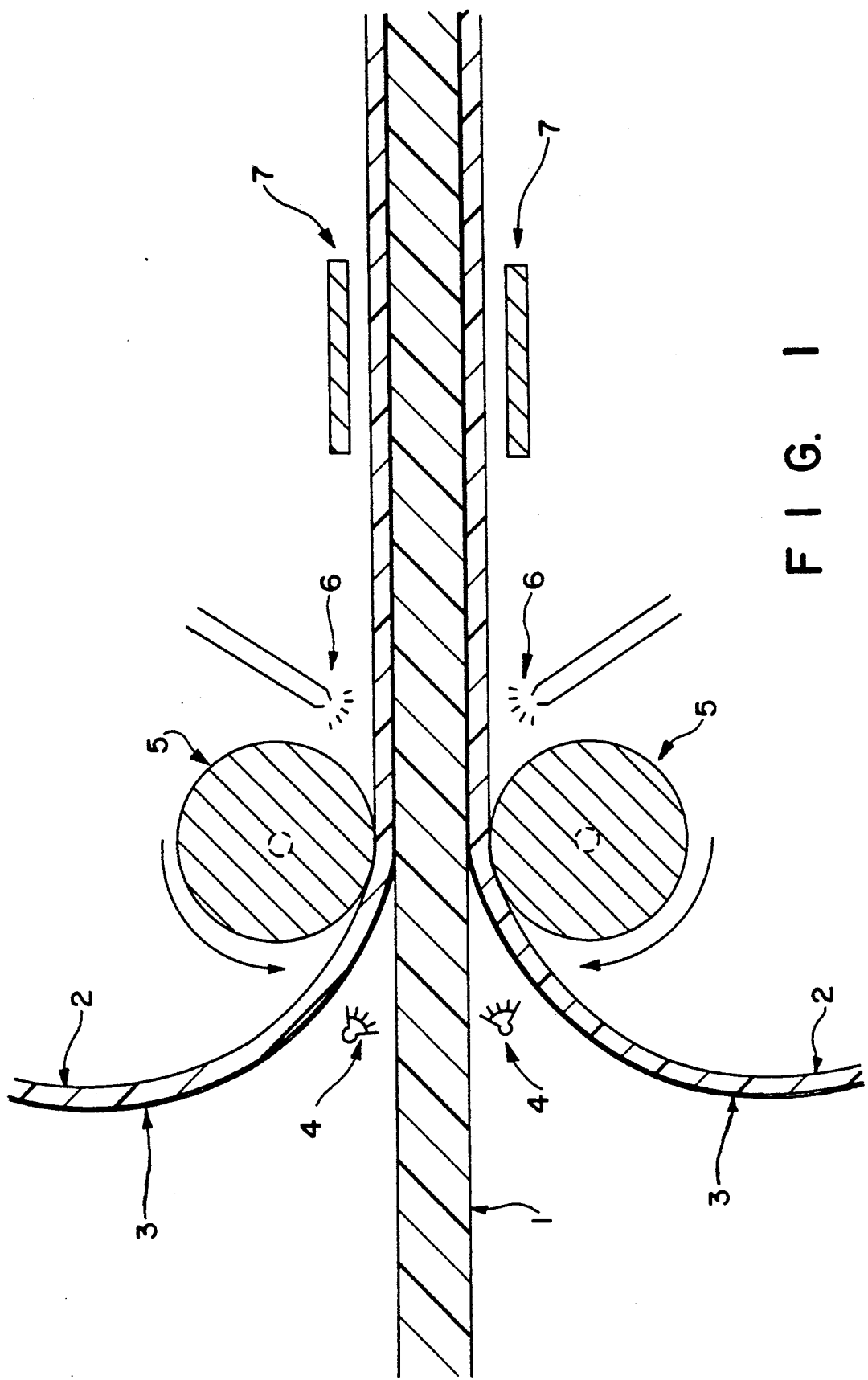
FIG. 1—A side elevation view of a honeycomb core being bonded to thermoplastic facing sheets demonstrating the continuous and essentially simultaneous method of a non-contacting heat source heating only the mating surfaces of the facing material and the core cell edges just prior to material contact and the application of pressure by a relatively lower temperature pressure roll.

The thermoplastic material for the core, e.g., honeycomb and the thermoplastic bonding film or layer of the facing materials useful in the process of the subject invention may be virtually any type, including those prepared from resin systems containing an amount of thermosetting resins. Among the thermoplastics useful, and not by limitation, are the polyethylenes, polypropylenes, polyoxymethylenes, polyarylene ethers, polyetherketones, polysulfones, polyethersulfones, polyamides, polyaramids, polybenzimidazoles, polyimides, thermoplastic polyurethanes, and the like. The portion of thermosetting resin may be, for example, bismaleimide resins, epoxy resins, cyanate resins, isocyanate resins, heat curable polyimides, and the like. When a thermosetting resin is used its amount is limited to provide overall thermoplastic properties to the core or facing material. Generally, no more than about 20% by weight of total resin will be thermosetting resin.

The thermoplastic honeycomb may be reinforced with fibrous reinforcement. The reinforcement may be in the form of spun bonded fibers, random continuous or chopped fibers which may be optionally needled and/or sized to provide integrity, woven fabric, unidirectional tape, or combinations of these. Among the fibers useful are inorganic fibers such as glass, quartz, carbon (carbon/graphite), boron nitride, silicon carbide, ceramics, and the like; or organic synthetic fibers such as those prepared from the thermoplastics mentioned earlier. Production of reinforced thermoplastic honeycomb is preferably accomplished following the disclosures of my prior copending applications, Ser. Nos. 07/622,253, filed Dec. 4, 1990 and 07/531,184, filed May 31, 1990 and 07/620,958, filed Dec. 3, 1990 and 07/620,253, filed Dec. 30, 1990 and 07/723,227, filed Jun. 28, 1991, respectively, the disclosures of which are incorporated herein their entirety by reference thereto.

The facing sheets may be of metal, fiber reinforced thermosetting resins or thermoplastics, or non-reinforced thermoplastics. The facing sheets and honeycomb core must be capable of adhering to the thermoplastic bonding film. Preferably, the thermoplastic utilized in the honeycomb, facing sheets, and bonding film are made from or contain the same thermoplastic resin.

If a thermoplastic film, coating or extrusion is used it must be compatible with the materials to be joined. Preferably, as previously stated, the thermoplastic film is preferably formed of the same thermoplastic material as the honeycomb material. Compatibility may be assessed by determining the force necessary to remove the skin from the honeycomb. The thickness of the bonding film may vary widely, but is preferably between about 0.05 mm and 1.0 mm, more preferably between 0.10 mm and 0.60 mm. The film may be first fusion bonded to the facing sheets or, if incompatible with the facing sheets, adhesively bonded thereto. It is further within the spirit of the invention to utilize instead of a separate bonding film which is fusion or adhesively bonded to the skins, a skin which contains sufficient thermoplastic to be able to fuse to the honeycomb. Such skins may also be viewed as an integral film/skin unit.

In the process of the invention, the bonding surfaces of the facing materials, i.e., the bonding thermoplastic film layer, whether or not previously attached to the facing sheets, or skins as they are often called, and the core cell edges are heated to their fusion temperature by a non-contacting heating means, for example by infrared radiation or hot gas jets; and simultaneously bonded together under pressure applied by a rolling device. No release substrates or agents are required since the non-mating surfaces of the skin and core material do not reach a temperature which would cause them to become tacky and stick to the rolling pressure device.

Instead of a thermoplastic film being heated to its melt temperature, a thermoplastic film may be melt extruded at the point of bonding.

In FIG. 1, the honeycomb (1) is faced with skins (2) by means of a bonding thermoplastic film (3) which has been previously melt fused or adhesively bonded to the skins (2). Infrared radiation or hot gas stream from source (4) is used to heat the exposed mating surface of the film (3) and core material (1) to their respective melt temperatures. Bonding is effectuated by pressure rollers (5) and essentially simultaneously the skinned core is initially cooled below the $T_g$ of the bonding materials by heat transfer to the pressure rollers (5) and/or optional air or water jets (6). In addition to the pressurizing rollers, the assembly may be additionally pressurized utilizing a standard platen press device (7) or pressure rollers (not shown) in order to further ensure the correct alignment of the assembled sandwich panel. The surface of the platens should generally be cooled so as to further remove any residual heat thus preventing overheating and collapsing of the core.

Figure 2:
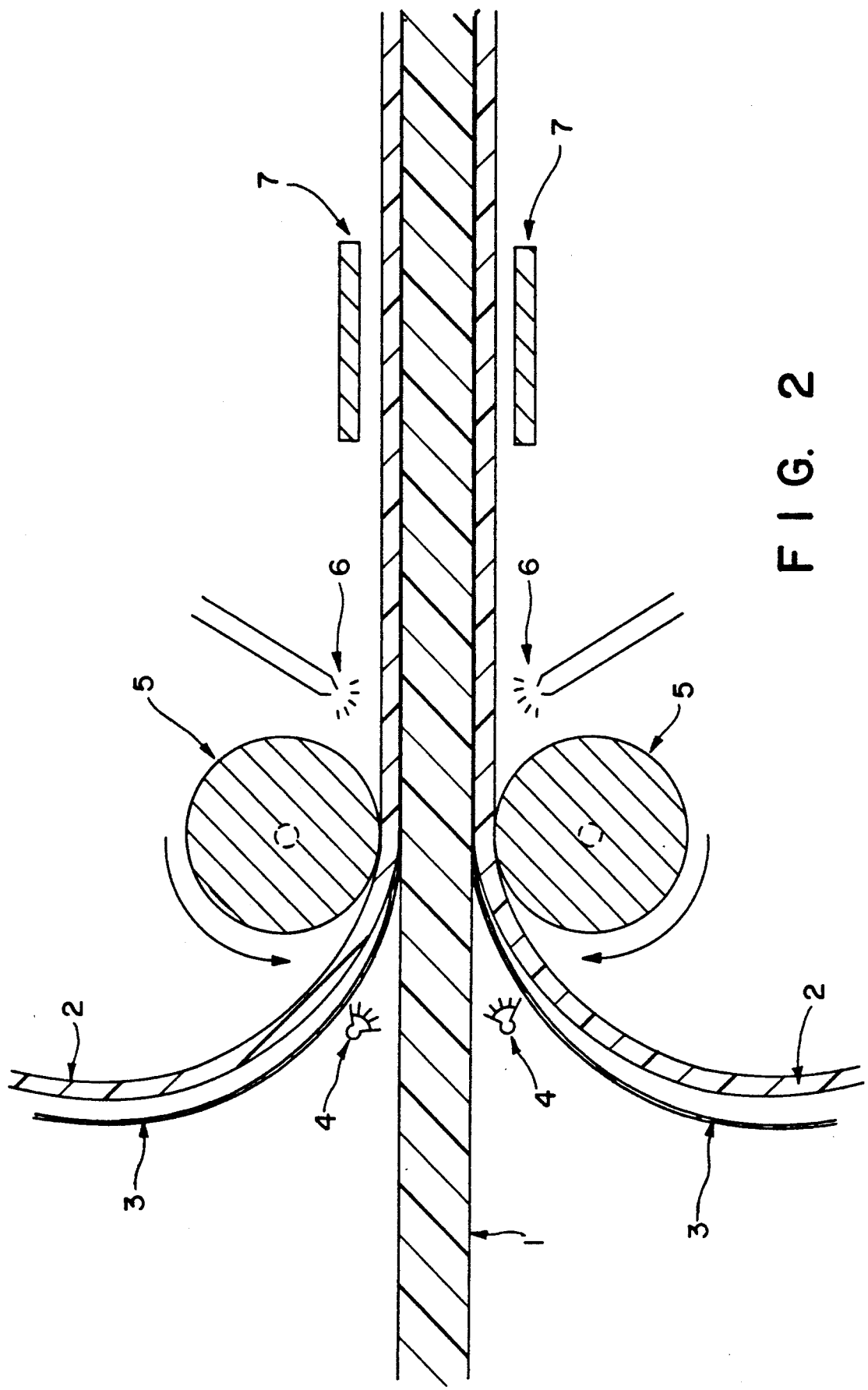
FIG. 2—A side elevation view of a honeycomb core being bonded to facing sheets utilizing a separate thermoplastic bonding film as per the method described in FIG. 1.

FIG. 2 illustrates an alternative embodiment of bonding skin to a thermoplastic core. According to this embodiment the bonding thermoplastic film (3) is fed separately to the contact area between the skin and core and is simultaneously fused to the skin and core. In this case the temperature of the film (3) should be raised to above its fusion temperature throughout its thickness.

Figure 3:
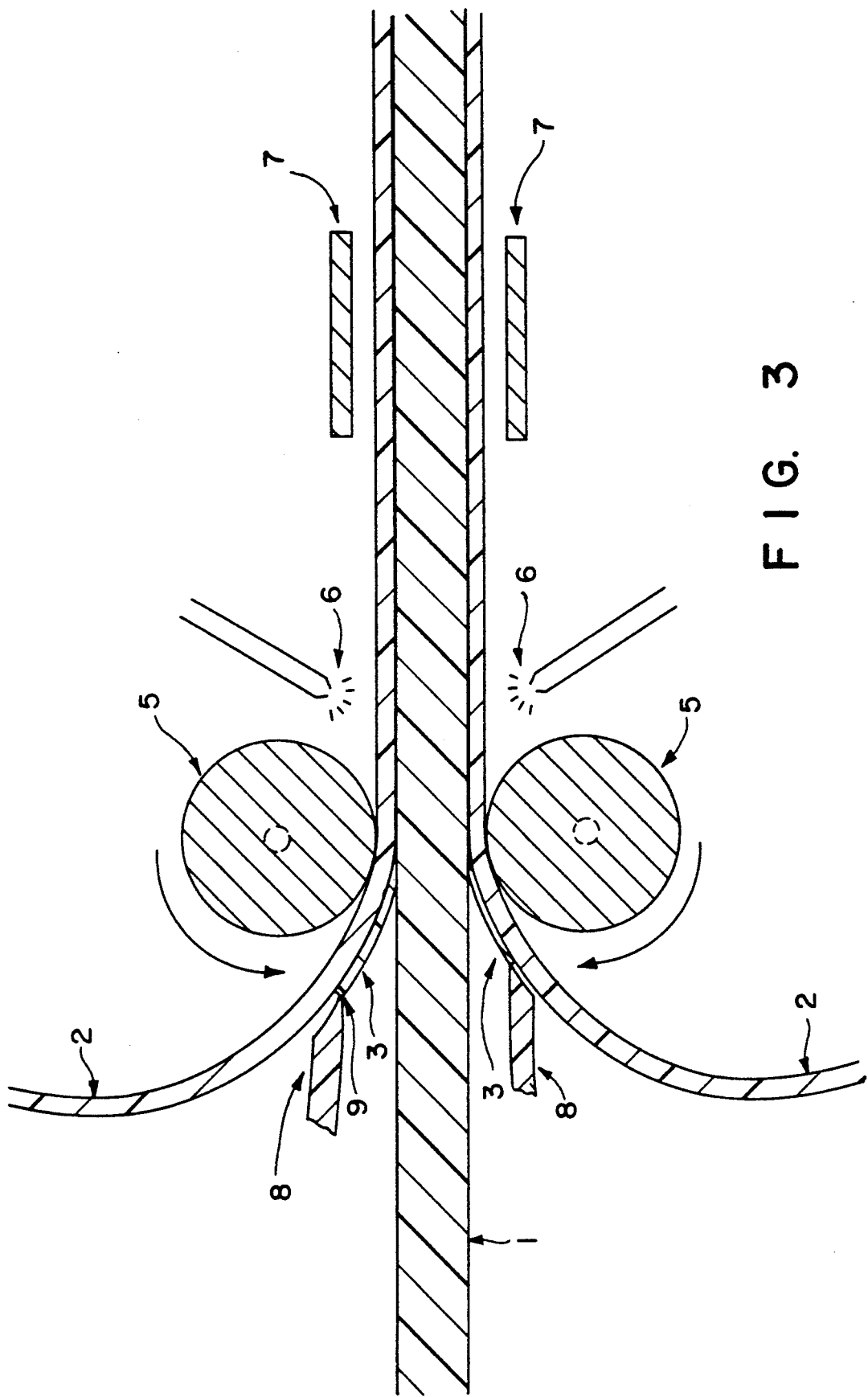
FIG. 3—A side elevation view of a honeycomb core being bonded to a facing sheet by the application of an extruded thermoplastic via a heated die at the or just prior to the contact area of the facing material and the core, wherein the latent heat of the extruded thermoplastic is sufficient to melt the exposed surfaces of the facing material and the core cell edges and cause bonding of the materials upon the application of pressure.

An alternative mode of operation of the invention process is illustrated in FIG. 3. In this case the bonding thermoplastic film (3) is directly extruded from heated extrusion die (8). The die lip (9) is located in close proximity to the skin (2) and at or near the contact area of the skin and core between rollers (5). In this manner the extruded thermoplastic film is transported by the skin to the contact area (nip) between the rollers while it retains sufficient latent heat to melt the exposed surfaces of the skin and the core to cause bonding of these materials upon the application of pressure.

In the figures the core is shown as thermoplastic honeycomb. However, the invention is equally adaptable to providing a skin or facing sheet to any thermoplastic core material. Also, while facing sheets or skins are shown being bonding to both opposed major surfaces of the honeycomb core it is also within the scope of the invention to provide the skin on only one surface.

It is also within the scope of the invention to provide a plurality of skins over the core layer in which case an additional pair of rollers (5) and heating device(s) (4) or extrusion die(s) (8) and bonding film(s) (3) can be provided downstream of the platens (7).

Generally, the skin or facing sheet and bonding film will have the same width as each other and as the thermoplastic core. However, for some applications it may be desirable to provide the skin over only a portion of the width of the core or a series of skins across the width of the core, which skins may abut the adjacent skin or may be spaced apart from the adjacent skin. Where multiple skins are laid down on the core they may be made from the same or different materials.

EXAMPLE 1

A 19 mm thick core measuring 30 cm by 30 cm and made of Tyvek ® spun bonded polyolefin was bonded to two 1.8 mm skins of glass fiber polypropylene impregnated mat supplied by Azdel, Inc. The bonding film was a 0.50 mm polypropylene film heated to its melting point by a stream of hot gas from a Convectronics heating element. Total time to assemble the honeycomb sandwich was 15 seconds. Minimal pressure was required for bonding.

EXAMPLE 2

The process of Example 1 was repeated but with a core made of glass fiber impregnated with polyethersulfone and facing sheets or skins of 0.38 mm polyethersulfone impregnated glass fiber. The bonding film utilized was a 0.13 mm film of polyetherimide thermoplastic (ULTEM ®). Total bonding time was 15 seconds as before.

EXAMPLE 3

Example 2 was repeated but the facing skin was a glass fiber impregnated with greater than 50% by weight of polyethersulfone. No additional film layer was required to bond the facing material to the core. Total bonding time was 15 seconds as before.

EXAMPLE 4

Example 3 was repeated but the facing material was a 0.13 mm thick thermoplastic polyurethane film and the core was made from the same thermoplastic polyurethane material as the facing material with a 0.31 mm cell wall thickness and a cell depth of approximately 6.5 mm. Total bonding time was less than 10 seconds for a panel 30 cm × 30 cm.

EXAMPLE 5

Example 4 was repeated but the facing material was a 0.27 mm thick TYVEK ® polyethylene web bonded to a 19 mm thick, 30 cm × 30 cm TYVEK ® honeycomb core. No additional adhesive media was used. Total bonding time was less than 10 seconds.

EXAMPLE 6

Example 5 was repeated with a facing material of 0.27 mm thick TYVEK ® polyethylene web but the core material was a 25 mm thick, 2 pounds per cubic foot polystyrene foam core. No additional adhesive media was used. Total bonding time was less than 10 seconds.

EXAMPLE 7

A 19 mm thick core measuring 30 cm by 30 cm and made of Tyvek ® spun bonded polyolefin was bonded to two 1.8 mm skins of glass fiber polypropylene impregnated mat supplied by Azdel, Inc. The bonding film was a 0.50 mm polypropylene film heated to its melting point by a ceramic infrared radiant heating element. Total time to assemble the honeycomb sandwich was 15 seconds. Minimal pressure was required for bonding.

I claim

1. A process for the continuous preparation of honeycomb sandwich materials by adhering one or more skins to a thermoplastic honeycomb core without causing collapse or deformation of the core comprising:
   (a) supplying the thermoplastic honeycomb core to a heating zone;
   (b) supplying a facing sheet comprising a layer of thermoplastic material at least at the surface of said facing sheet facing to said honeycomb core;
   (c) applying heat in said heating zone via a non-contacting heat source to the exposed surface of said layer of the thermoplastic material of said facing sheet and to the exposed surface of said thermoplastic honeycomb core to raise the temperature of said exposed surfaces to the fusion temperature of the thermoplastic materials; and
   (d) essentially simultaneously and continuously joining the heated thermoplastic honeycomb core, the heated layer of thermoplastic material and the facing sheet and applying pressure to the resulting sandwich structure sufficient to cause the facing sheet to be fusion bonded to the thermoplastic honeycomb core via said thermoplastic layer but insufficient to cause deformation or collapse of the honeycomb core.

2. The process of claim 1 wherein said layer of thermoplastic material is an integral component of the facing sheet.

3. The process of claim 1 wherein the heating of the thermoplastic material in step (c) is accomplished by means of radiant heat.

4. The process of claim 1 wherein the heating of the thermoplastic material in step (c) is accomplished by means of a hot gas stream.

5. The process of claim 1 wherein the thermoplastic material of the core has substantially the same or lower fusion temperature than the layer of thermoplastic material at the surface of said facing sheet.

6. The process of claim 1 wherein the same thermoplastic material is used in the thermoplastic core and in the layer of thermoplastic material.

7. The process of claim 1 wherein step (d) further comprises substantially simultaneously with fusion bonding cooling the thermoplastic materials being bonded to below their glass transition temperature (Tg).

8. A process for the continuous preparation of honeycomb sandwich materials by adhering facing sheets to a thermoplastic honeycomb core, said process comprising (a) supplying the thermoplastic honeycomb core to a heating zone;

(b) supplying the facing sheets to the heating zone, (c) extruding a layer of a heated thermoplastic material in the heating zone and depositing the heated thermoplastic material layer on the surface of the facing sheet to be joined to the thermoplastic honeycomb core, (d) transporting the facing sheet and heating thermoplastic material layer from step (c) to the thermoplastic honeycomb core while the heated thermoplastic material layer retains sufficient latent heat to melt the facing surfaces of the facing sheet and thermoplastic honeycomb core, and essentially simultaneously and continuously applying pressure to the resulting sandwich structure of heated facing sheet, thermoplastic material layer and thermoplastic honeycomb core, to cause the facing sheet to be fusion bonded to the thermoplastic honeycomb core via the thermoplastic material layer.

9. The process of claim 8 wherein step (d) further comprises substantially simultaneously with fusion bonding cooling the thermoplastic materials being bonded to below their glass transition temperature (Tg).

10. The process of claim 8 wherein the thermoplastic material of the core has substantially the same or lower fusion temperature than the layer of thermoplastic material at the surface of said facing sheet.

11. The process of claim 8 wherein the same thermoplastic material is used in the thermoplastic core and in the layer of thermoplastic material.

* * * * *